(12) United States Patent
Hunt et al.

(10) Patent No.: US 11,167,670 B1
(45) Date of Patent: Nov. 9, 2021

(54) CLOSING DEVICE FOR USE IN MOTOR VEHICLES

(71) Applicant: Kiekert AG, Heiligenhaus (DE)

(72) Inventors: Robert J. Hunt, Davisburg, MI (US); Robert S. Pettengill, Farmington, MI (US)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 16/941,593

(22) Filed: Jul. 29, 2020

(51) Int. Cl.
  *B60N 2/433* (2006.01)
  *B60N 2/22* (2006.01)

(52) U.S. Cl.
  CPC .......... *B60N 2/433* (2013.01); *B60N 2/2245* (2013.01)

(58) Field of Classification Search
  CPC .. B60N 2/366; B60N 2/01583; B60N 2/2245; B60N 2/01541; B60N 2/919
  USPC .................................................... 297/378.13
  See application file for complete search history.

(56) References Cited

U.S. PATENT DOCUMENTS

| | | | | |
|---|---|---|---|---|
| 8,608,245 | B2 * | 12/2013 | Wieclawski | B60N 2/366 297/378.13 |
| 8,757,679 | B2 | 6/2014 | Torkowski | |
| 2015/0145263 | A1 * | 5/2015 | Farris | E05B 85/26 292/195 |
| 2019/0338568 | A1 * | 11/2019 | Klein | E05B 79/20 |

FOREIGN PATENT DOCUMENTS

| | | |
|---|---|---|
| EP | 2291568 B1 | 7/2013 |
| WO | 2019224672 A1 | 11/2019 |

* cited by examiner

*Primary Examiner* — Sarah B McPartlin
(74) *Attorney, Agent, or Firm* — Renner, Otto, Boisselle & Sklar, LLP

(57) ABSTRACT

A closing device for use in motor vehicles, in particular a backrest latch for locking and unlocking backrests in motor vehicles. The closing device is also provided with a multi-pawl locking mechanism substantially consisting of a catch, a comfort pawl that interacts with the catch and a blocking pawl that secures the comfort pawl. The catch includes an L-shaped insertion slot for a closing pin for forming at least a first closed position and a second closed position.

18 Claims, 8 Drawing Sheets

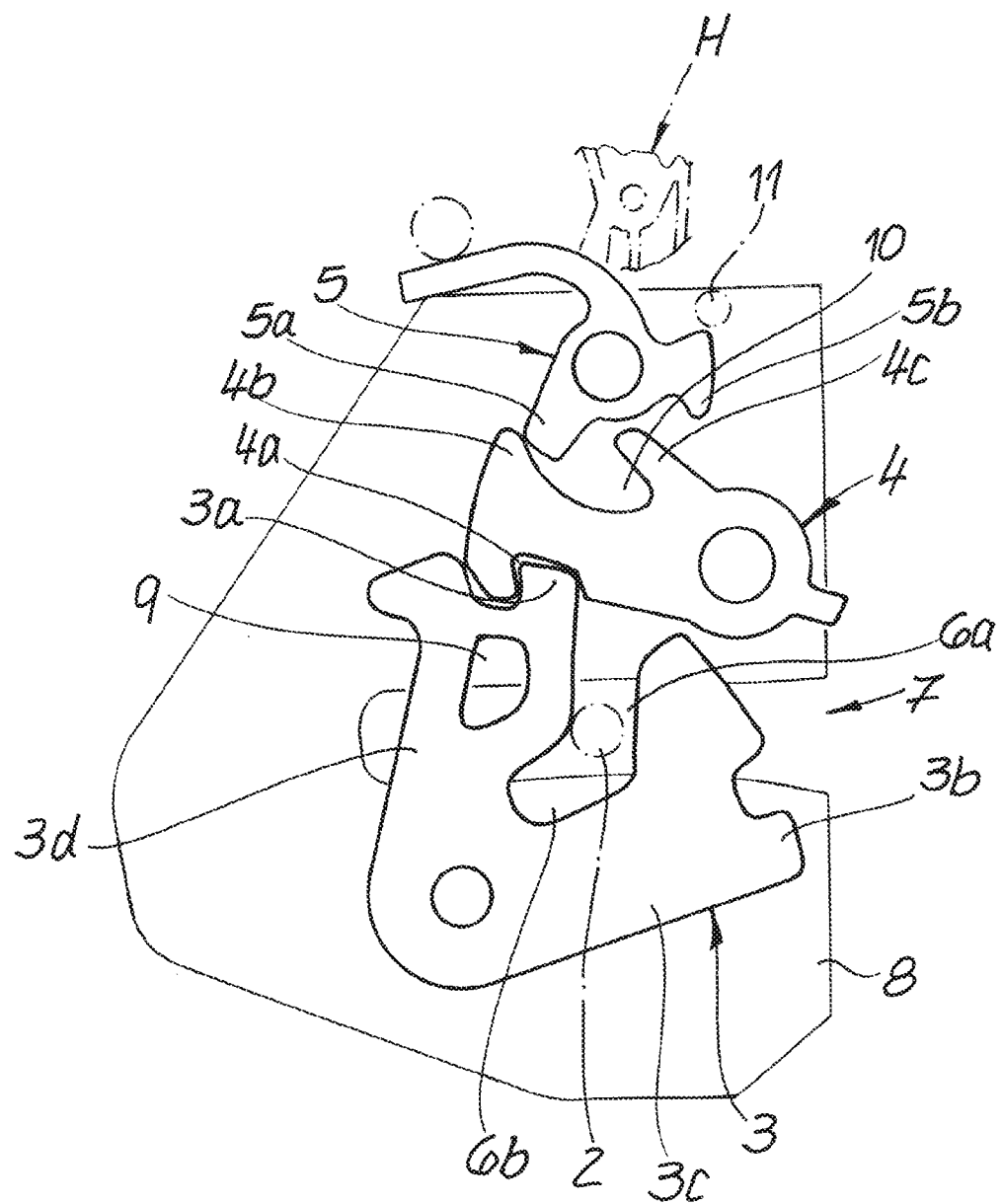

CLOSING DEVICE FOR USE IN MOTOR VEHICLES

FIELD OF INVENTION

The invention relates to a closing device for use in motor vehicles, in particular a backrest latch for locking and unlocking backrests in motor vehicles, comprising a multi-pawl locking mechanism substantially consisting of a catch, a comfort pawl that interacts with the catch and a blocking pawl that secures the comfort pawl.

BACKGROUND OF INVENTION

Multi-pawl locking mechanisms, and in particular dual-pawl locking mechanisms, comprising a comfort pawl and a blocking pawl that secures the comfort pawl, are used to reduce operating forces, in particular when opening the locking mechanism. Such multi-pawl locking mechanisms are also typically advantageous in terms of noise characteristics. This is known in principle and is described in detail in EP 2 291 568 B1 of the applicant.

Similar closing devices, and in particular backrest latches for backrests in motor vehicles, are described in detail in WO 2019/224672 A1. In this document, an additional opening drive is provided. This is intended to improve the overall security and functionality.

The prior art is not able to satisfy all aspects. Therefore, in backrest latches, there is a growing requirement to be able to lock said latches in two different upright positions—in addition to the obligatory folded-down position. This also creates the opportunity, in particular for rear passengers, to be able to change the inclination of the backrest when necessary. The former solutions do not allow for such options, but ultimately only switch between the upright position and the folded-down position, without creating the opportunity to be able to vary the upright position in a simple manner. This is where the invention starts from.

SUMMARY OF INVENTION

The technical problem addressed by the invention is to provide such a closing device for use in motor vehicles, and in particular a backrest latch for locking and unlocking backrests in motor vehicles, which has a greater amount of comfort than the former prior art.

In order to solve this technical problem, the invention proposes that, in a generic closing device, the catch comprises a slot for a closing pin for forming at least a first closed position and a second closed position.

The invention therefore first of all operates using a specially designed catch, which comprises an L-shaped insertion slot, known in principle from the state of the art, for the closing pin. As a result of the shape of the insertion slot in the catch, it is possible to form at least two closed positions, specifically the first and the second closed position.

In this case, the closing device is usually designed such that the first closed position corresponds to the closing pin being caught in the first, long "L" limb, while the second closed position corresponds to the closing pin assuming its caught position in the second, short "L" limb. The orientation and length of each section optimized to compensate for allowable closing pin misalignment while maintaining the targeted seatback angle. This proposal orients each section of the insertion slot so that it is roughly perpendicular to the path of the closing pin. The improvement over prior art is that the targeted seatback angle is better maintained over the allowable misalignment of the closing pin.

As a result, when the closing device is closed, the closing pin initially enters the first section of the insertion slot, where it is secured in the first closed position. By operating a handle, for example, an operator can now remove the comfort pawl from the catch to such an extent that the closing pin enters the second section, which is connected to first section at an angle, as a result of the associated backrest being manually acted upon. This corresponds to the second closed position. In this case, the invention is also based on the knowledge that said backrest latch is generally attached inside or to said backrest, whereas the closing pin is connected to a body of the associated motor vehicle, or vice versa, such that it cannot move.

Furthermore, it has proven to be particularly expedient for the catch to be provided, on the outer circumference thereof, with a first ratchet hook, which belongs to the first closed position, and a second ratchet hook, which belongs to the second closed position. Furthermore, the comfort pawl generally comprises a ratchet recess that engages with the particular ratchet hook. In this way, the two closed positions can be restrained in both the opening and closing directions. This requires the handle or a drive to be actively acted upon in order to be able to act on the comfort pawl accordingly. In contrast, in a common and conventional multi-pawl locking mechanism, it is expressly unnecessary for a handle to be acted upon when switching from a pre-ratchet position to a main ratchet position, for example.

The comfort pawl is generally provided with a blockading limb, which interacts with the blocking pawl in the closed state. This means that, in the closed state or in both the first closed position and the second closed position, the blocking pawl ensures that the blockading limb holds the ratchet hook on the comfort pawl such that it engages with the ratchet recess in the catch in each case.

In addition, the comfort pawl is usually provided with an opening limb, which interacts with the blocking pawl in order to actuate it. This means that, by the blocking pawl acting on said opening limb, the comfort pawl is actuated and consequently lifted from its engagement with the catch. In this connection, the closing device is usually designed such that the two limbs, i.e. the blockading limb on the one hand and the opening limb on the comfort pawl on the other, are arranged on a common operating arm of the comfort pawl so as to be opposite the ratchet hook. The comfort pawl is usually formed as a single-arm pawl. This means that the operating arm is provided with an associated axis or axis of rotation at its end, at which the comfort pawl is mounted so as to rotate about said axis with respect to a strike plate, on which said closing device is mounted, for example.

In addition, the closing device is usually designed such that the two limbs, i.e. the blockading limb on the one hand and the opening limb on the other, are arranged at a spacing from one another on the operating arm of the comfort pawl. As a result, the two limbs can define an engagement opening therebetween. The engagement opening regularly receives an operating limb of the blocking pawl. During a pivoting movement, the blocking pawl uses this operating limb to ensure that, depending on the pivoting movement of the blocking pawl, the blockading limb on the one hand and the opening limb of the comfort pawl on the other hand are acted upon. If the blocking pawl acts on the blockading limb of the comfort pawl by means of the operating limb, the blocking pawl ensures that the comfort pawl defines the first or second closed position in conjunction with the catch. In contrast, the action of the operating limb of the blocking pawl on the opening limb of the comfort pawl actuates the comfort pawl and the closing device as a whole can be opened as a result.

In conclusion, the blocking pawl is advantageously connected to a handle and/or a drive. By means of the handle or the drive, the blocking pawl can be acted upon such that it actuates the comfort pawl, i.e. fully removes it from the engagement with the catch. However, it is also possible for the blocking pawl to assume an "unblocked position" in addition to this "actuated position" with the aid of the handle or the drive. In this "unblocked position," it is generally possible, for example by means of a corresponding application of force, to move the backrest or the closing device according to the invention from its first closed position into the second closed position (or back again).

As a result, a closing device for use in motor vehicles is provided, which firstly provides a considerable improvement in the comfort of rear-seat backrests such that said backrest can be fixed in two different upright positions. This considerably also improves the rear passengers' comfort with respect to the prior art.

In addition, both closed positions correspond to flawless locking of the backrest such that, in the event of a collision, an obligatory seatbelt can perform its functions optimally. Furthermore, the closing device according to the invention is characterized by low operating forces and a simple design, which typically does without a spring that acts on the comfort pawl. In addition, the backrest latch can be operated especially simply and intuitively, since both a handle and an electric motor-driven drive can be used. Both variants are also conceivable at the same time.

All of this is possible while taking into account every safety requirement, whereby forces of at least several hundred, preferably of several thousand N that act on the closing device are absorbed without any problems and any relative movements between the backrest and the motor vehicle are effectively prevented. This is where the essential advantages can be found.

BRIEF DESCRIPTION OF DRAWINGS

The invention will be described in more detail in the following on the basis of the drawings that show just one embodiment, in which:

FIG. 2 shows the closing device in the "unblocked position,"

DETAILED DESCRIPTION

Figure 1A:
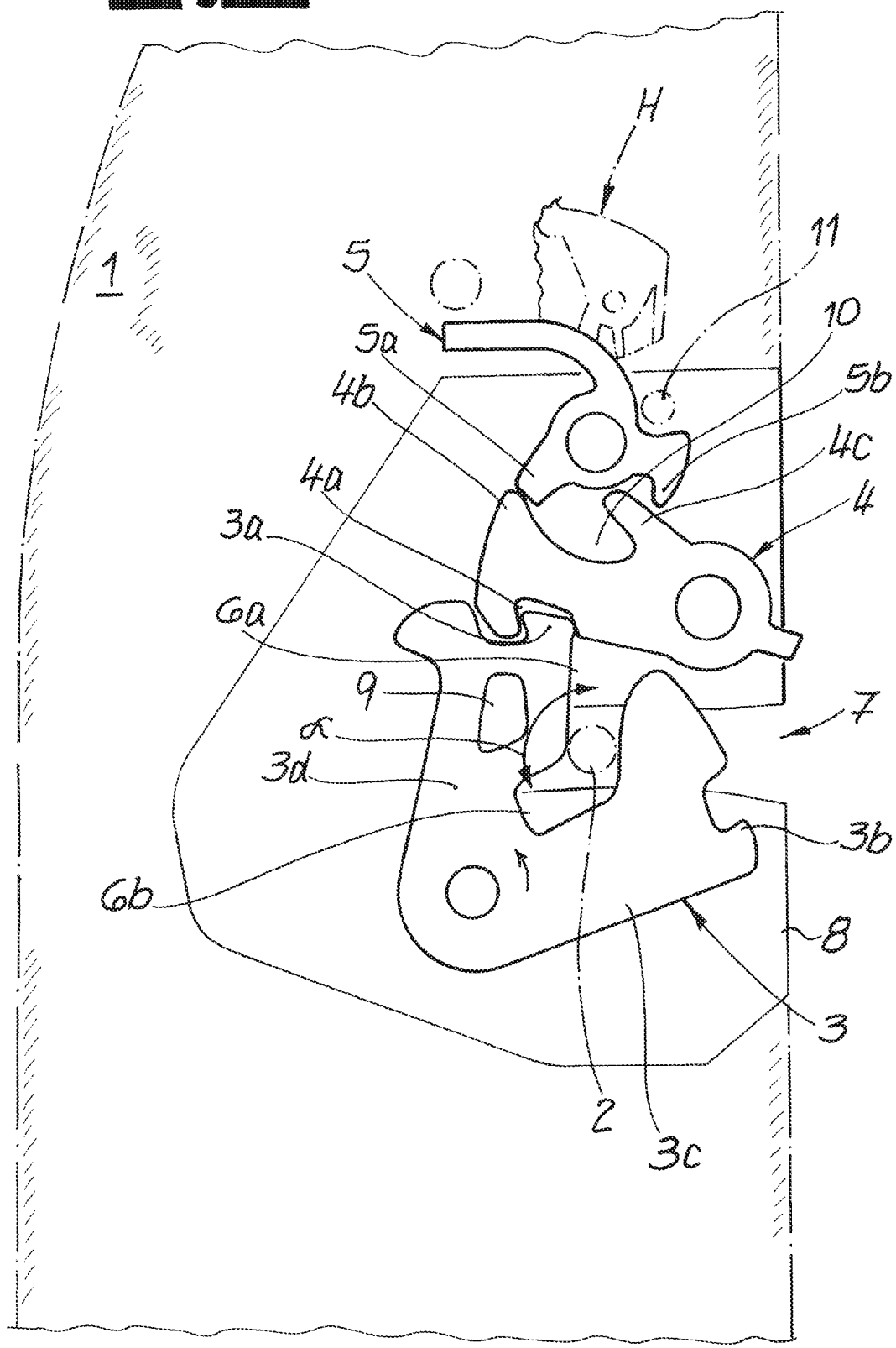
FIGS. 1A and 1B show the closing device according to the invention in a first closed position (FIG. 1A) and in a second closed position (FIG. 1B)

The figures show a closing device for use in motor vehicles. In fact, within the context of the embodiment, said closing device is a backrest latch for locking and unlocking backrests 1 inside a motor vehicle, which backrests are shown only in FIG. 1A. For this purpose, the backrest latch, which is typically attached in or to the particular backrest 1, interacts with a closing pin 2 that is fixed to the vehicle body.

To be specific, the closing device or the backrest latch shown firstly comprises a multi-pawl locking mechanism 3, 4, 5, which, within the context of the embodiment, is a dual-pawl locking mechanism 3, 4, 5. The multi-pawl locking mechanism or dual-pawl locking mechanism 3, 4, 5 specifically and substantially comprises a catch 3, a comfort pawl 4 that interacts with the catch 3, and lastly a blocking pawl 5 that secures the comfort pawl 4.

This means that the comfort pawl 4 interacts with the catch 3, specifically with two ratchet hooks 3a and 3b. Ratchet hook 3a is a first ratchet hook 3a belonging to a first closed position (to be described in more detail in the following). In contrast, the second ratchet recess 3b corresponds to a second closed position, which is likewise explained in more detail in the following. In order to interact with the two ratchet hooks 3a and 3b in the outer circumference of the catch 3, the comfort pawl 4 is provided with a ratchet recess 4a that engages with the particular ratchet hooks 3a, 3b.

According to the invention, the catch 3 comprises an L-shaped insertion slot 6a, 6b. The L-shaped insertion slot 6a, 6b in the catch 3 interacts with the closing pin 2, as will be explained in more detail in the following. For this purpose, the closing pin 2 must firstly enter an inlet mouth 7 of a strike plate 8. The strike plate 8 is solid and made of metal. In addition, the strike plate 8 is used for mounting the catch 3 as well as the comfort pawl 4 and lastly the blocking pawl 5. All of said elements 3, 4, 5 of the multi-pawl locking mechanism 3, 4, 5 are provided with particular bearing pins that are anchored in the strike plate 8 for this purpose. According to the embodiment, the particular bearing pins are arranged at a spacing from one another and extend substantially perpendicularly to the plane of the drawing, in which plane the largely planar strike plate 8 is arranged and positioned.

The catch 3 is provided with the L-shaped insertion slot 6a, 6b for the closing pin 2 in order to be able to form at least the previously addressed first closed position and second closed position. FIG. 1A shows the first closed position. This corresponds to the closing pin 2 being held and caught inside the long "L" limb 6a of the L-shaped insertion slot 6a, 6b, which limb is provided on the insertion side. In contrast, if the closing pin 2 assumes the second closed position as per the view in FIG. 1B, the closing pin 2 is caught and held in the short "L" limb 6b that is connected to the long "L" limb 6a. It can be seen that the two limbs 6a, 6b of the L-shaped insertion slot 6a, 6b are connected to one another at an obtuse angle. In fact, within the context of the embodiment and in a non-restrictive manner, angles α of between approximately 120° and 140° are observed between the two limbs 6a, 6b, to present a possible vertical misalignment of the closing pin 2 without a significant variation in horizontal position relative to perceived seatback angle.

The comfort pawl 4 is not only provided with the ratchet recess 4a that engages with the particular ratchet hooks 3a, 3b in the catch 3, but it is clear from the figures that the comfort pawl 4 also comprises a blockading limb 4b, which interacts with the blocking pawl 5 in the closed position. In addition to this blockading limb 4b, the comfort pawl 4 is also provided with an opening limb 4c, which interacts with the blocking pawl 5 in order to actuate the comfort pawl 4, as will be explained in more detail in the following.

The figures show that the two above-mentioned limbs 4b, 4c, i.e. the blockading limb 4b and the opening limb 4c, are connected to an operating arm of the comfort pawl 4 so as to be opposite the ratchet recess 4a. In fact, as a single-arm pivot lever, the comfort pawl 4 is provided with said operating arm, which is rotatably connected to the strike plate 8 at its end. It can also be seen that the two above-mentioned limbs 4b, 4c are arranged at a spacing from one another on said operating arm. As a result, the blockading limb 4b and the opening limb 4c of the comfort pawl 4 can collectively define an engagement opening 10 for an operating limb 5a of the blocking pawl 5 therebetween.

In addition to said operating limb 5a, the blocking pawl 5 also comprises a holding limb 5b. In this case, the stop limb 5b can interact with a stationary stop 11 on another handle H. The holding limb 5b is provided for holding the handle H by means of the stop 11 in an ajar warning position until the rotation into a fully latched position is complete.

FIG. 1A shows the closing device according to the invention or the backrest latch in its first closed position. The open or opened state of the backrest latch, as shown in FIG. 3B, precedes this. In this opened state, the closing pin 2 can firstly enter the backrest latch via the inlet mouth 7 and can then interact with the catch 3. For this purpose, the catch 3 is pivoted in an anticlockwise direction about its axis from the opened position, as per the view in FIG. 3B, in order to transition into the position in FIG. 1A.

As a result, the backrest latch or the multi-pawl locking mechanism 3, 4, 5 assumes its first closed position shown in FIG. 1A. In this first closed position, the closing pin 2 is caught inside the long "L" limb 6a of the inlet slot 6a, 6b in the catch 3, which limb is provided on the insertion side. In this case, the comfort pawl 4 engages with the first ratchet hook 3a in the outer circumference of the catch 3 by means of its ratchet recess 4a. This is possible because the comfort pawl 4 can carry out a corresponding slight movement in an anticlockwise direction when transitioning from the view in FIG. 3B to FIG. 1A, and the blocking pawl 5 likewise allows for such a movement.

In the first closed position according to FIG. 1A, the first ratchet hook 3a of the catch 3 is in engagement with the ratchet recess 4a of the comfort pawl 4, ensuring that the catch 3 and, together therewith, the closing pin 2 caught in the "L" limb 6a are secured. In this (spring-assisted) process, the blocking pawl 5 assumes a position that is different to the open position according to FIG. 3B such that the operating limb 5a of the blocking pawl 5 travels towards the blockading limb 4b of the comfort pawl 4 and thereby ensures that the comfort pawl 4 is secured.

Figure 1B:
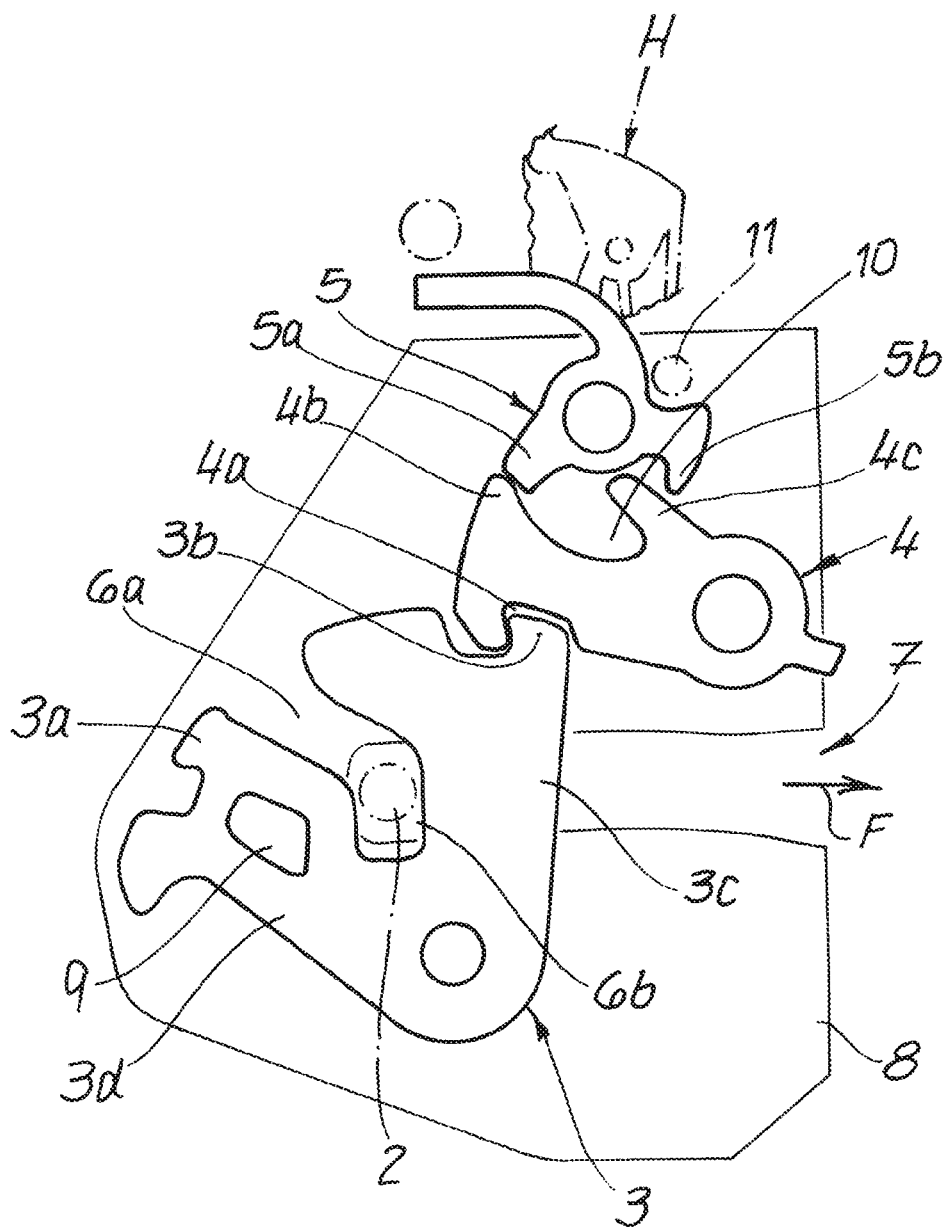
Figure 3A:
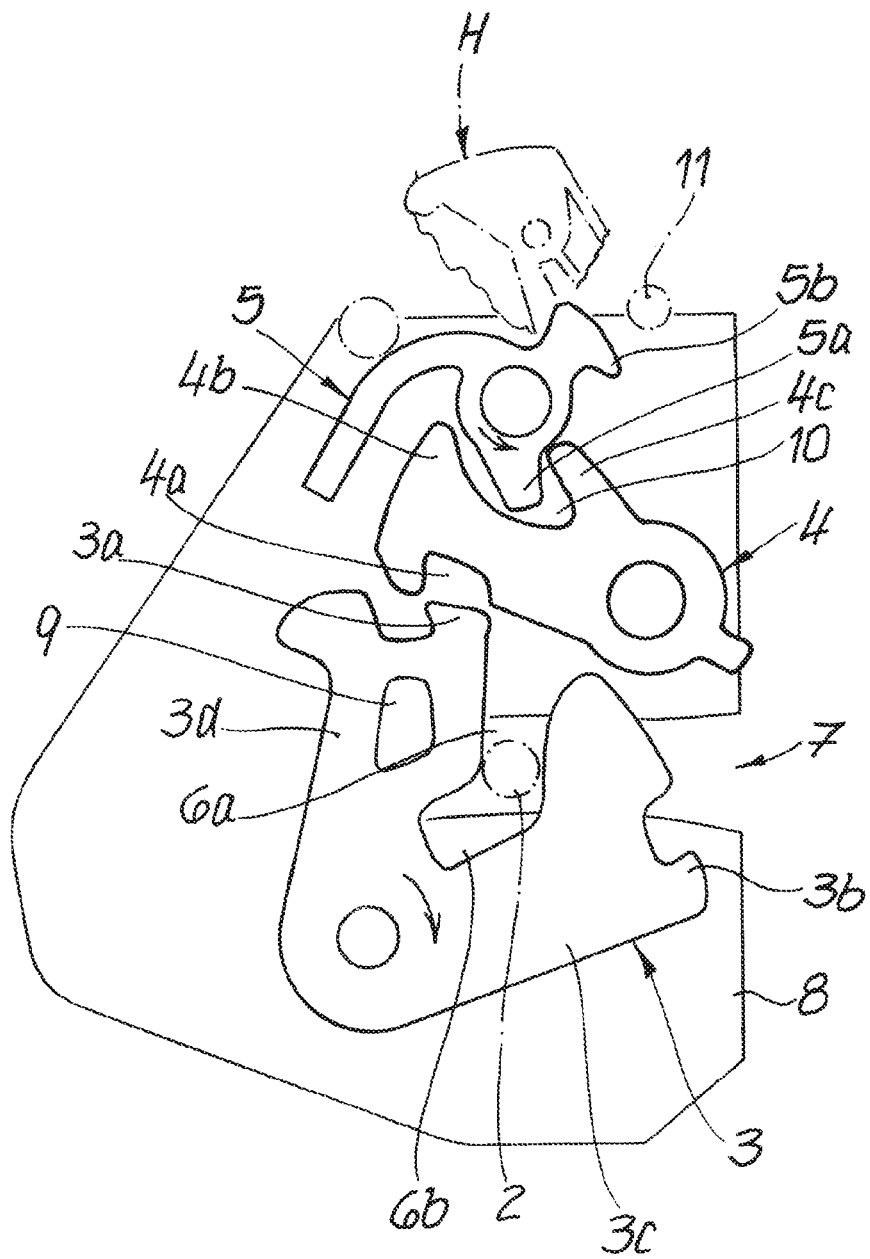
FIGS. 3A and 3B show an opening procedure for the closing device and the actuation of the comfort pawl.
Figure 3B:
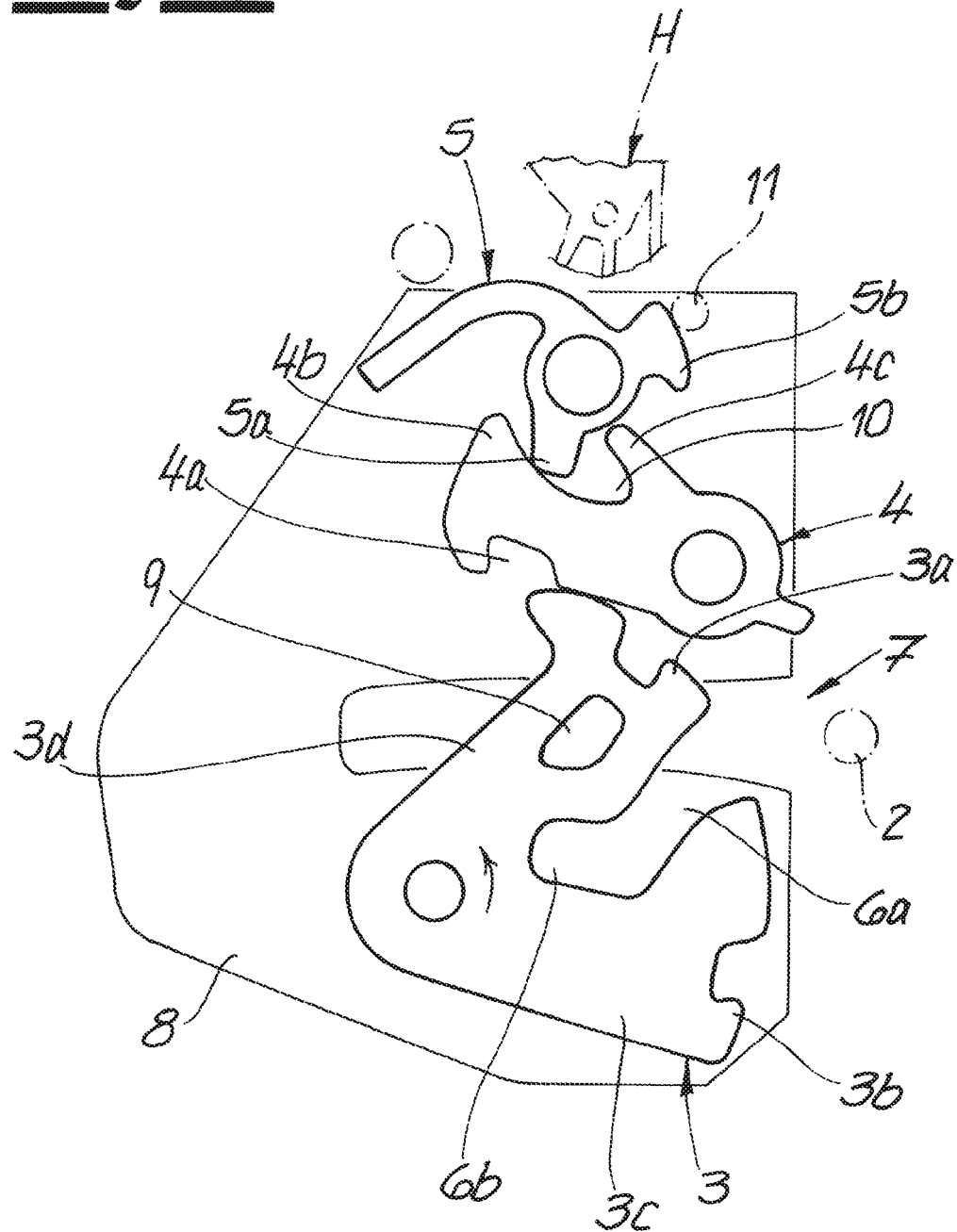
Figure 6:
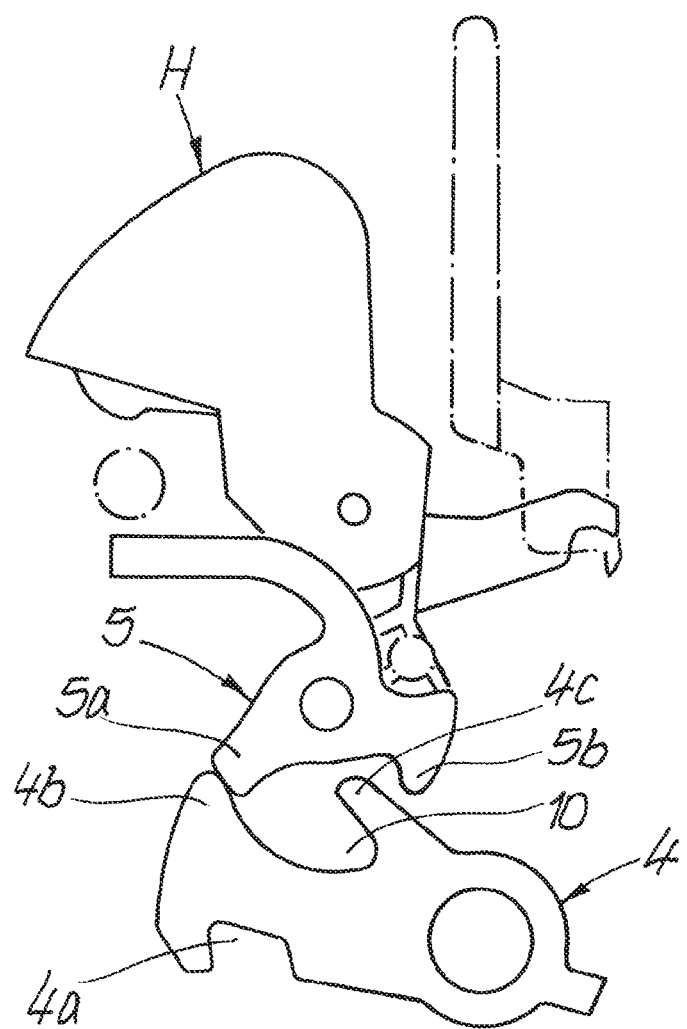
FIG. 6 shows a handle for operating the closing device according to the invention.

In order to transition from the first closed position according to FIG. 1A to the second closed position according to the view in FIG. 1B, the blocking lever 5 now only needs to be moved into its "released position" according to FIG. 3a. In this case, the blocking pawl 5 is pivoted ever so slightly in an anticlockwise direction from the position in FIG. 1A, for example by means of the handle H shown in FIG. 6. As a result, the operating limb 5a of the blocking pawl 5 operates limb 4c of the comfort pawl 4. As a result, the comfort pawl 4 is pivoted in a clockwise direction from the functional position according to FIG. 1A such that, when the backrest 1 and therefore the catch 3 are correspondingly acted upon by the closing pin 2, the catch 3 is pivoted in an anticlockwise direction when transitioning from FIG. 1A to FIG. 1B until the second closed position according to the view in FIG. 1B is reached. This is because the ratchet recess 4a in the comfort pawl 4 then engages with the second ratchet hook 3b on the catch 3. The blocking pawl 5 moves (in a spring-assisted manner) in an anticlockwise direction from FIG. 2 back into its position shown in FIG. 1B so that the operating limb 5a of the blocking pawl 5 secures the comfort pawl 4 once again by said operating limb 5a traveling towards the blockading limb 4b of the comfort pawl 4.

FIG. 3A now shows an opening procedure for the closing device or the backrest latch. This corresponds to a pivoting movement of the blocking pawl 5 in an anticlockwise direction from the closed state in FIG. 1A, for example, which is of such a size that it goes beyond the "unblocked position" according to FIG. 2 in any case. As a result, the operating limb 5a completely plunges into the engagement opening 10 such that the comfort pawl 4 is completely released from the catch 3. The catch 3 can accordingly move, by way of example, in a clockwise direction in each case from the first closed position according to FIG. 1A or the second closed position according to FIG. 1B, and frees the previously caught closing pin 2. This leaves the backrest latch or the closing device according to the invention via the inlet mouth 7 such that the backrest 1, together with the backrest latch attached therein or thereto, is moved freely with respect to the vehicle body, and can be folded down onto a seat, for example.

Figure 4:
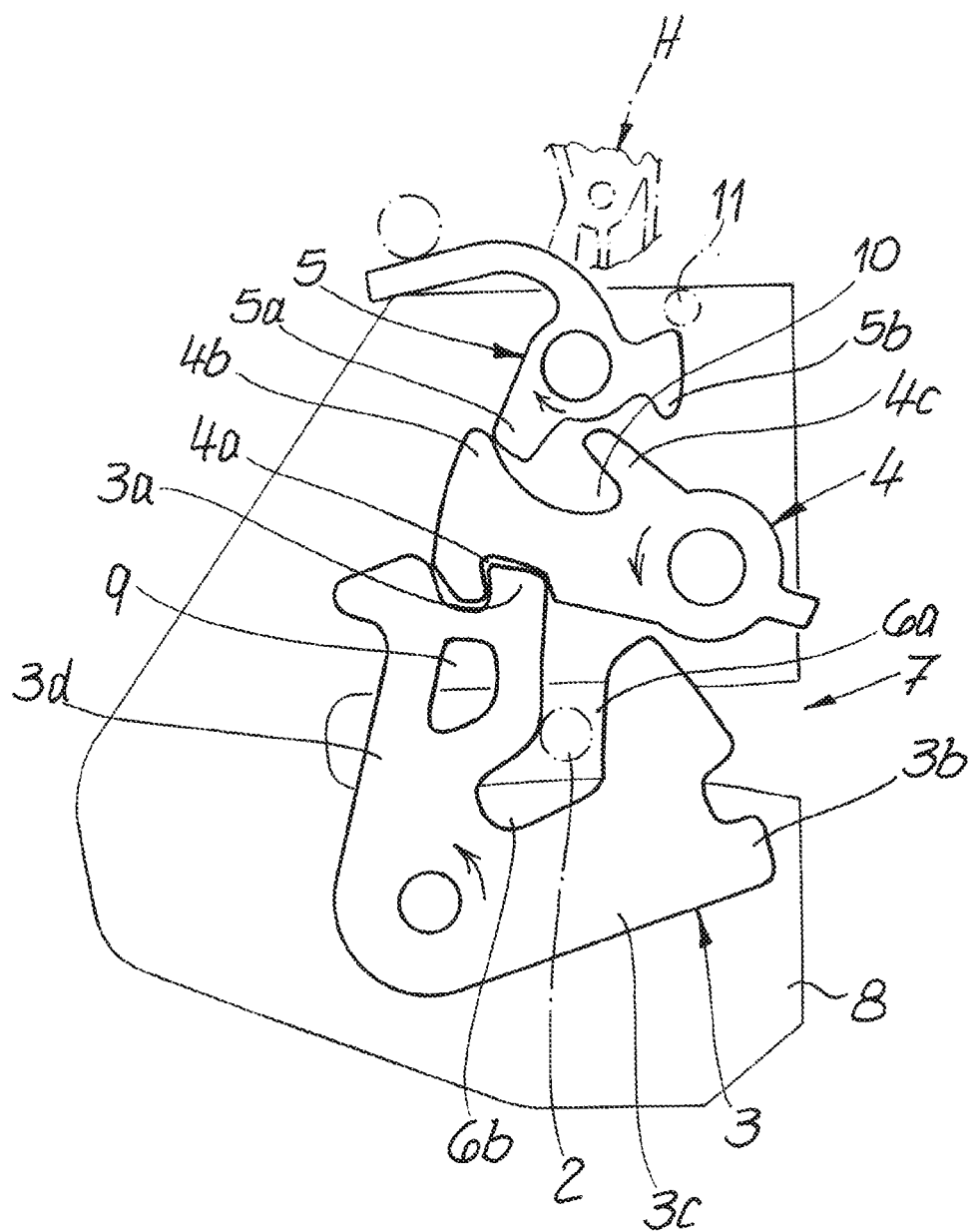
FIG. 4 shows a closing procedure for the closing device according to the invention.
Figure 5:
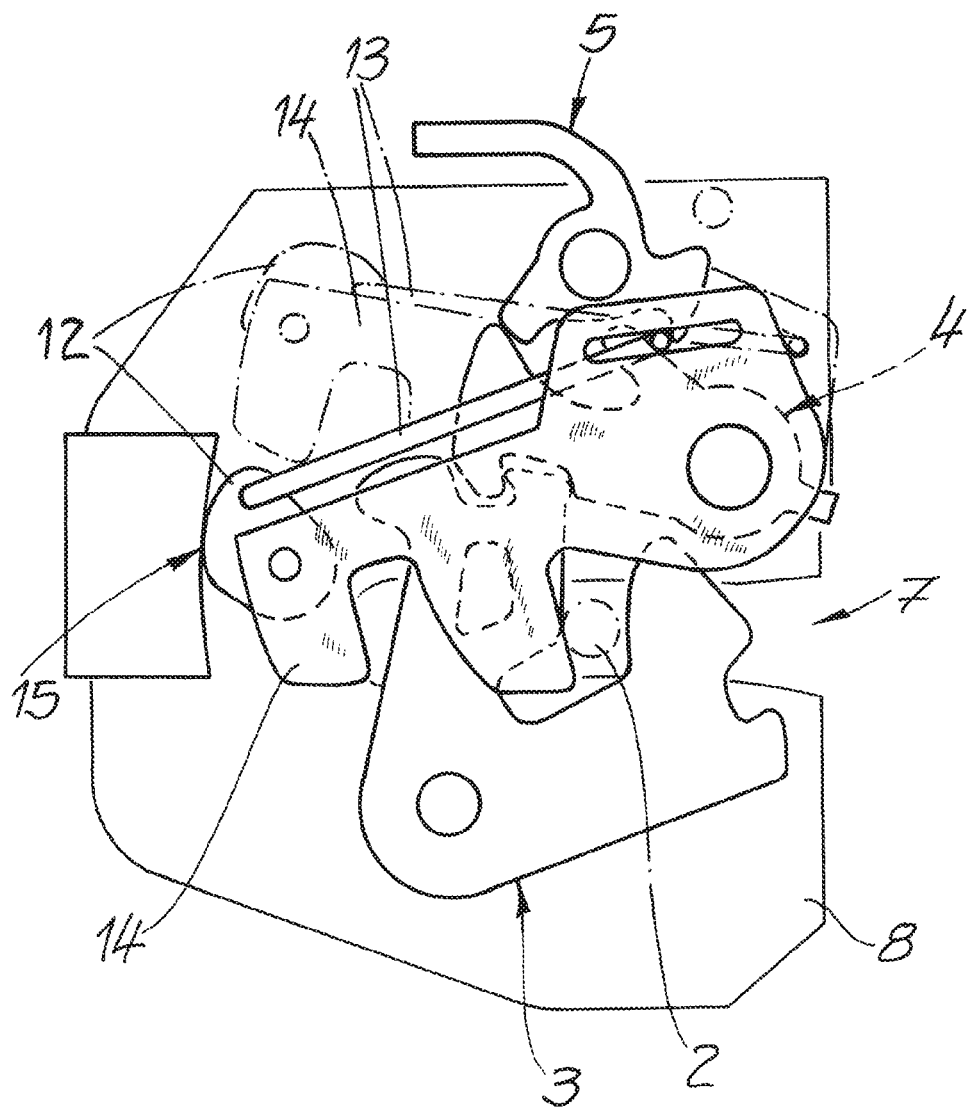
FIG. 5 shows a different embodiment, comprising an additional cam controller.

In conclusion, FIG. 4 shows a closing procedure, which leads directly to the first closed position according to FIG. 1A. It can be seen that, during this closing procedure, the catch 3 is firstly pivoted in an anticlockwise direction by the closing pin 2 entering the inlet mouth 7. As a result, the comfort pawl 4 can likewise pivot in an anticlockwise direction and engage the first ratchet hook 3a on the catch 3 enters the ratchet recess 4a in the comfort pawl. Likewise, this pivoting movement of the comfort pawl 4 in an anticlockwise direction ensures that the blocking pawl 5 can also move (in a spring-assisted manner), specifically in the clockwise direction shown in FIG. 4. As a result, the operating limb 5a of the blocking pawl 5 is able to travel towards the blockading limb 4b of the comfort pawl 4 such that the blocking pawl 5 can thereby functionally secure the comfort pawl 4 in the first closed position, which is then reached in the view according to FIG. 1A.

The invention claimed is:

1. A closing device for use in motor vehicles, the closing device comprising a multi-pawl locking mechanism having a catch, a comfort pawl that interacts with the catch, and a blocking pawl that secures the comfort pawl, wherein the catch comprises an L-shaped insertion slot for receiving a closing pin in a first closed position and in a second closed position;
   wherein an outer circumference of the catch includes a first ratchet hook and a second ratchet hook, and the comfort pawl comprises a ratchet recess that engages with the first ratchet hook in the first closed position, and the ratchet recess engages with the second ratchet hook in the second closed position.

2. The closing device according to claim 1, wherein the comfort pawl comprises a blockading limb, which interacts with the blocking pawl in a closed state of the multi-pawl locking mechanism.

3. The closing device according to claim 2, wherein the comfort pawl comprises an opening limb, which interacts with the blocking pawl.

4. The closing device according to claim 3, wherein the blockading limb and the opening limb are arranged on an operating arm of the comfort pawl so as to be opposite a ratchet hook of the comfort pawl.

5. The closing device according to claim 4, wherein the blockading limb and the opening limb are arranged at a spacing from one another on the operating arm and define an engagement opening for an operating limb of the blocking pawl therebetween.

6. The closing device according to claim 3, wherein the blocking pawl is configured to engage the opening limb of the comfort pawl to lift the comfort pawl from engagement with the catch.

7. The closing device according to claim 1, wherein the blocking pawl is connected to a handle and/or a drive.

8. The closing device according to claim 1 further comprising a strike plate to which the catch, the comfort pawl, and the blocking pawl are mounted.

9. The closing device according to claim 8, wherein the comfort pawl includes an operating arm rotatably connected to the strike plate at one end of the comfort pawl.

10. The closing device according to claim 1, wherein the L-shaped insertion slot is formed by a first limb and a second limb that is shorter than the first limb.

11. The closing device according to claim 10, wherein the closing pin is held in the first limb when the multi-pawl locking mechanism is in the first closed position, and in the second limb when the multi-pawl locking mechanism is in the second closed position.

12. The closing device according to claim 10, wherein the first limb and the second limb are connected to each other at an obtuse angle.

13. The closing device according to claim 12, wherein the obtuse angle is between 120 and 140 degrees.

14. The closing device according to claim 1, wherein the blocking pawl includes an operating limb that is engageable with the comfort pawl and a stop limb that is engageable with a stationary stop.

15. The closing device according to claim 1, wherein the comfort pawl is formed as a single-arm pawl.

16. The closing device according to claim 1, wherein the closing device is configured for a backrest.

17. The closing device of claim 1, wherein the blocking pawl interacts directly against the comfort pawl to secure the comfort pawl.

18. A closing device for use in motor vehicles, the closing device comprising a multi-pawl locking mechanism having a catch, a comfort pawl that interacts with the catch, and a blocking pawl that secures the comfort pawl, wherein the catch comprises an L-shaped insertion slot for a closing pin for forming at least a first closed position and a second closed position;

wherein:
the comfort pawl comprises a blockading limb, which interacts with the blocking pawl in a closed state of the multi-pawl locking mechanism;
the comfort pawl comprises an opening limb, which interacts with the blocking pawl;
the blockading limb and the opening limb are arranged on an operating arm of the comfort pawl so as to be opposite a ratchet hook of the comfort pawl; and
the blockading limb and the opening limb are arranged at a spacing from one another on the operating arm and define an engagement opening for an operating limb of the blocking pawl therebetween.

* * * * *